(No Model.)

J. W. HOBSON.
TRUCK.

No. 462,829. Patented Nov. 10, 1891.

Witnesses:
Harold B. Binney
Albert J. Edwards.

Inventor:
Joseph W. Hobson

UNITED STATES PATENT OFFICE.

JOSEPH W. HOBSON, OF BAYONNE, NEW JERSEY.

TRUCK.

SPECIFICATION forming part of Letters Patent No. 462,829, dated November 10, 1891.

Application filed December 11, 1890. Serial No. 374,404. (No model.)

*To all whom it may concern:*

Be it known that I, JOSEPH W. HOBSON, a citizen of the United States, and a resident of Bayonne, in the county of Hudson and State of New Jersey, have invented a new and useful Improvement in Trucks, of which the following is a full, clear, and exact description.

This invention relates to improvements in hand-trucks; and it consists in a hand-truck constructed in the manner and for the purposes hereinafter described.

Figure 1:
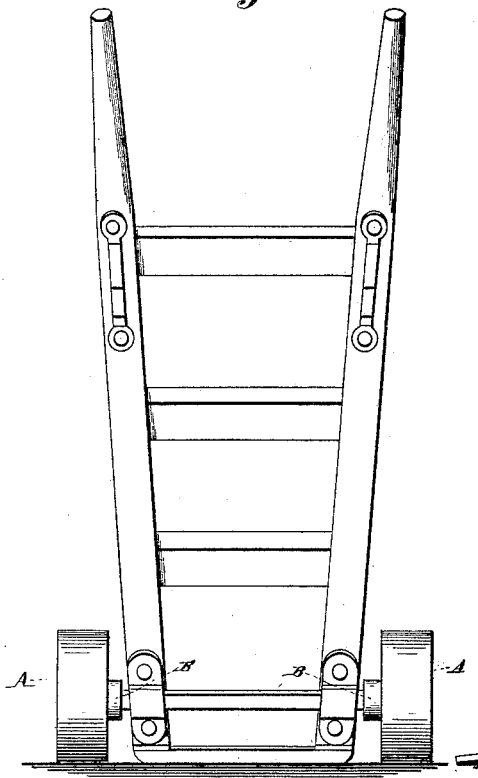
Figure 2:
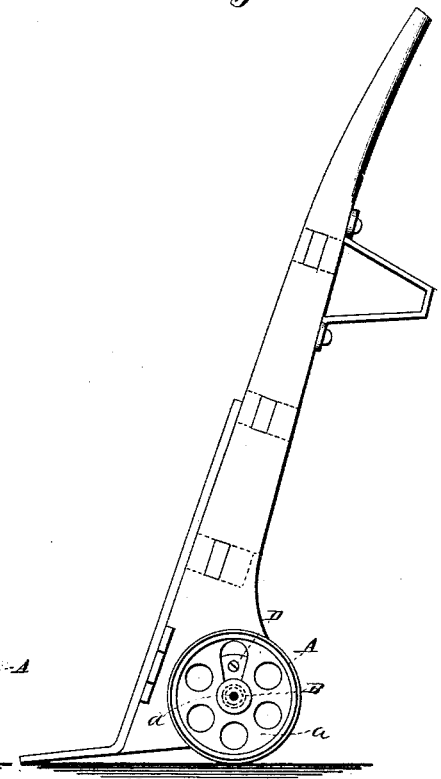
Figure 3:
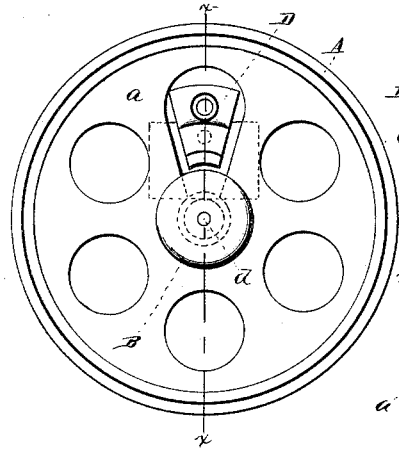
Figure 4:
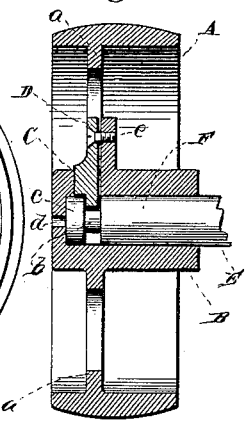
Figure 5:
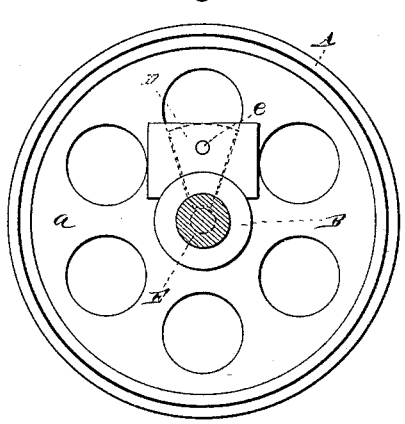

In the accompanying sheet of drawings, Figure 1 is a rear view of my truck. Fig. 2 is a side view of the same. Fig. 3 is a plan of rear view of truck-wheel. Fig. 4 is a section on line $xx$ of Fig. 3. Fig. 5 is a face view of truck-wheel.

Similar letters of reference indicate like parts in the several figures.

This invention is applicable to any form of hand-truck, and it relates mainly to the construction of the wheel and axle of such trucks. The truck-frame being of any desired size and form, it need not be particularly described. The wheels A of the truck may be made of any suitable material, preferably, however, of cast metal, and formed with a web $a$, from which projects a hub B. Into this hub, but not through it, is drilled or formed a journal-bearing. This bearing terminates just short of the front face of the wheel, as is shown in Fig. 4. Formed in the web $a$ is a key-seat C, and fitted into this seat is a key D. The truck-wheel so made is provided with an axle E, on the extremities of which are formed journals F. These journals are provided with recesses $b$, (see Fig. 4,) concentrically turned in the journals. Now when the journals of the axles are inserted into the journal-bearings in the hubs of the wheels these recesses or channels will register with the key-seats C, formed in the hub $a$ of the wheels, so that when the key D is fitted in the key-seat its lower end will project into the recess $b$ and also bear on the head $c$ of the journals F, and when the wheels and axle are so fitted together it is obvious that the wheels may freely turn on the journals, but cannot accidentally become detached therefrom, for the key D in the recess C will prevent it, and when the journals are so fitted in the wheels the head $c$ of the journals will bear against the metal at the inner end of the journal-bearing, as in Fig. 4. An oil-hole $d$ may be made through the face of the wheel for lubricating.

With the foregoing construction neither linchpins nor nuts are needed to keep the wheels on the axle of the trucks, and, moreover, the face of the wheels present plane surfaces without the usual protruding axle-ends to obstruct the free use of the truck and to be bent and broken. To keep the key D in place a screw $e$ may be employed.

Having now described my invention, what I claim as new, and desire to secure by Letters Patent, is—

1. In combination in a hand-truck, a wheel constructed with a journal-bearing, a key-seat, and a key, an axle therefor provided with an annular keyway, into which the said key fits when in position, and means for securing the key to the key-seat, as a screw $e$, which fits flush with the surface of the wheel, as and for the purposes set forth.

2. In a hand-truck, an axle provided with an annular recess or way, a wheel provided with a bearing for the said axle, a key projecting when in place into the said way and fitting in the web of the wheel and flush with the outer surface of the wheel, and a securing device for the key, substantially as and for the purposes set forth.

J. W. HOBSON.

Witnesses:
G. M. PLYMPTON,
HAROLD BINNEY.